(12) United States Patent
Decker

(10) Patent No.: US 8,640,382 B2
(45) Date of Patent: Feb. 4, 2014

(54) STABLE CABLE SYSTEM AND METHOD

(75) Inventor: Thomas J. Decker, Glen Allen, CA (US)

(73) Assignee: Zip-It Tree Ties, Rocklin, CA (US)

( * ) Notice: Subject to any disclaimer, the term of this patent is extended or adjusted under 35 U.S.C. 154(b) by 0 days.

(21) Appl. No.: 13/182,388

(22) Filed: Jul. 13, 2011

(65) Prior Publication Data

US 2012/0011769 A1    Jan. 19, 2012

Related U.S. Application Data

(60) Provisional application No. 61/364,085, filed on Jul. 14, 2010.

(51) Int. Cl.
*A01G 17/14*    (2006.01)

(52) U.S. Cl.
USPC .................................................. 47/43; 47/42

(58) Field of Classification Search
USPC ........ 47/42, 43, 44, 46, 47; 52/148, 146, 166; D8/1, 349; 248/499, 508
See application file for complete search history.

(56) References Cited

U.S. PATENT DOCUMENTS

| | | | |
|---|---|---|---|
| 3,912,165 A | | 10/1975 | Pira |
| 4,249,342 A | * | 2/1981 | Williams .......................... 47/43 |
| 4,318,246 A | | 3/1982 | Jungbluth et al. |
| 4,319,428 A | | 3/1982 | Fox |
| 4,366,647 A | * | 1/1983 | Daun ................. 47/42 |
| 4,519,162 A | | 5/1985 | Stuckey |
| 4,649,666 A | * | 3/1987 | Ness et al. ......................... 47/43 |
| D310,769 S | * | 9/1990 | Jensen ............................... D8/1 |
| 5,199,214 A | * | 4/1993 | Caldwell ........................... 47/42 |
| 5,402,600 A | * | 4/1995 | Tompkins ......................... 47/42 |
| 5,867,936 A | * | 2/1999 | Napolitano ....................... 47/43 |
| 6,389,743 B1 | | 5/2002 | Stephenson |
| 7,533,489 B1 | * | 5/2009 | Nelson et al. ..................... 47/43 |
| 7,661,224 B1 | * | 2/2010 | Poyas ............................... 47/42 |
| 2003/0000138 A1 | * | 1/2003 | Ambrose .......................... 47/44 |
| 2008/0149786 A1 | | 6/2008 | Bradley |
| 2009/0031623 A1 | * | 2/2009 | Decker ............................. 47/43 |

* cited by examiner

*Primary Examiner* — T. Nguyen
(74) *Attorney, Agent, or Firm* — Sawyer Law Group, P.C.

(57) ABSTRACT

A stable cable system and method are disclosed. The stable cable system comprises at least two stakes, at least one cable, wherein the at least one cable is coupled to the at least two stakes, wherein the at least one cable has at least one loop and at least one connector, wherein the at least one connector is inserted through the at least one loop and around an object.

6 Claims, 3 Drawing Sheets

STABLE CABLE SYSTEM AND METHOD

CROSS-REFERENCE TO RELATED APPLICATION

This application claims the benefit of U.S. Provisional Application No. 61/364,085, filed on Jul. 14, 2010, entitled "STABLE CABLE," which is incorporated here by reference in its entirety.

FIELD OF THE INVENTION

The present invention relates to stabilizing objects, and more particularly, to a stable cable system utilized in stabilizing objects.

BACKGROUND

Stabilizing objects is a problem in numerous settings. In the growing and care of trees, nurseries face problems with maintaining their tree inventories. Storing the trees upright and straight presents a major problem for these nurseries when dealing with large numbers of trees. Conventionally, nurseries string cables from stakes at various distances and then tie the trees to these cables with tape to help maintain their tree inventories. This conventional system does not provide adequate stability against wind and other factors that forces the trees to slide along the cable and lean in the direction of the wind. As a result, irrigation issues can arise and the trees can get damaged. Nursery labor is also frequently utilized to straighten the trees that have been blown over by the wind which increases nursery costs.

Accordingly what is needed is a system and method that overcomes the above-identified issues. The system and method should be cost effective, easily implemented and adaptable to existing environments. The present invention addresses such a need.

SUMMARY OF THE INVENTION

A stable cable system and method are disclosed. The stable cable system comprises at least two stakes, at least one cable, wherein the at least one cable is coupled to the at least two stakes, wherein the at least one cable has at least one loop and at least one connector, wherein the at least one connector is inserted through the at least one loop and around an object.

BRIEF DESCRIPTION OF THE DRAWINGS

The accompanying drawings illustrate several embodiments of the invention and, together with the description, serve to explain the principles of the invention. One of ordinary skill in the art will recognize that the particular embodiments illustrated in the drawings are merely exemplary, and are not intended to limit the scope of the present invention.

DETAILED DESCRIPTION OF PREFERRED EMBODIMENTS

The present invention relates to stabilizing objects, and more particularly, to a stable cable system utilized in stabilizing objects. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A stable cable system and method are disclosed. The stable cable system comprises at least two stakes, at least one cable, wherein the at least one cable is coupled to the at least two stakes, wherein the at least one cable has at least one loop and at least one connector, wherein the at least one connector is inserted through the at least one loop and around an object. In so doing, the object is secured to the at least one cable with more stability and this prevents damage to the object and reduces costs associated with the object sliding along the at least one cable.

Although aspects of the present invention will be described in the context of a tree as the object being stabilized, one of ordinary skill in the art readily recognizes that the descriptions are applicable to stabilizing any type of object or product desired including but not limited to signs, flags, hanging pots and shade cloth and that would be within the spirit and scope of the present invention.

Figure 1:
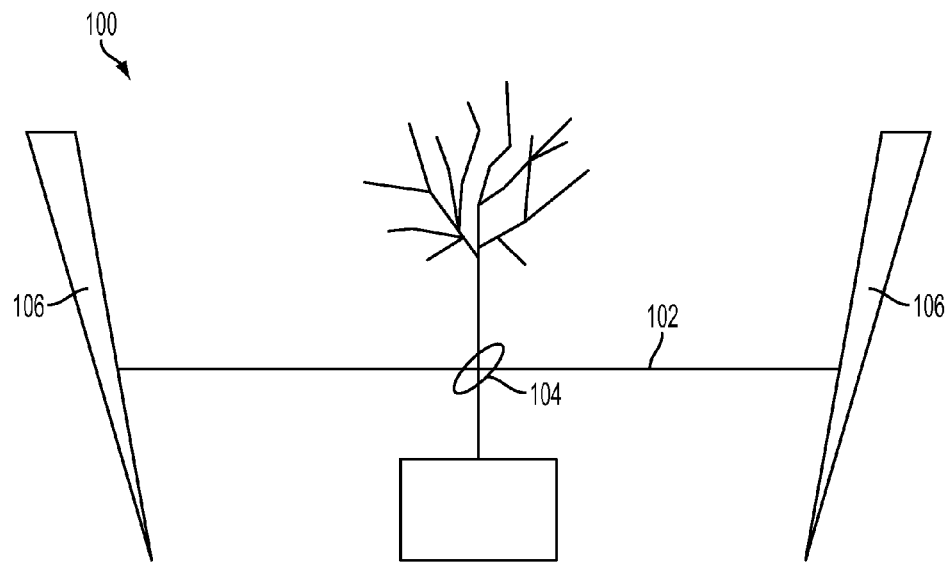
FIG. 1 illustrates a conventional tree stabilizing method.

In a conventional tree stabilizing system, nurseries string wires from stakes at various distances and then tie the trees to these wires with tape. FIG. 1 illustrates this conventional tree stabilizing system 100 that includes at least one wire 102, tape 104, and at least two stakes 106. The at least one wire 102 is strung between the at least two stakes 106 and the trees are commonly tied to the at least one wire 102 with tape 104. The tree is typically tied at two to four feet up the tree trunk depending on the trees size. In one embodiment, the tape 104 is green nursery tape. In another embodiment, two wires are used depending on the location of the nursery and the corresponding weather patterns for that location.

This conventional tree stabilizing system 100 does not provide adequate stability against wind that forces the trees to slide along the wire and lean in the direction of the wind. This causes irrigation issues, damage to the trees and increased nursery labor while having to straighten out the trees.

Figure 2:
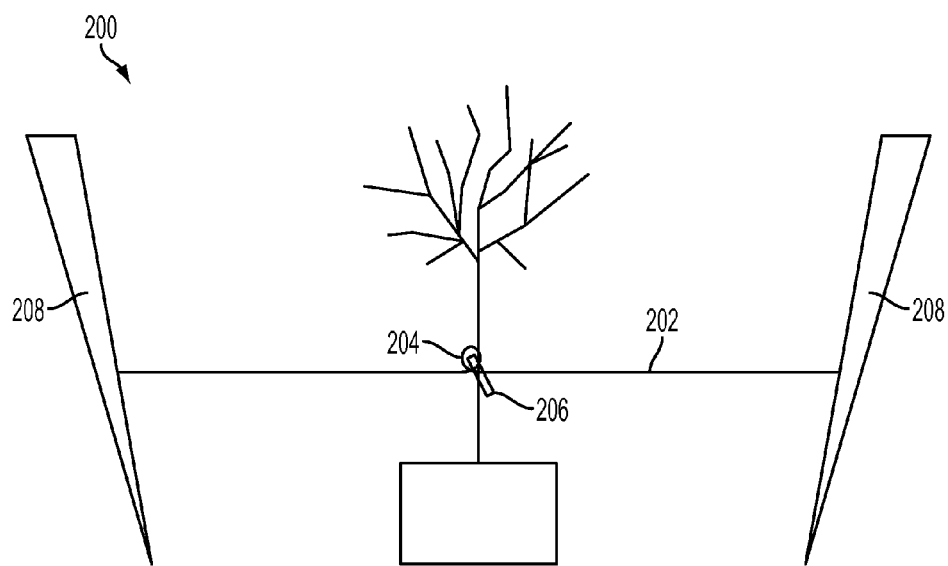
FIG. 2 illustrates a stable cable system in accordance with an embodiment.

The present invention addresses these drawbacks. FIG. 2 illustrates a stable cable system 200 that includes at least one cable 202, at least one loop 204, at least one connector 206 and at least two stakes 208. In the stable cable system 200, the at least one cable 202 is coupled to the at least two stakes 208. In the stable cable system 200, the at least one cable 202 includes at least one loop 204 and the at least one connector 206 is inserted through the at least one loop 204 and around a tree.

One of ordinary skill in the art readily recognizes that the at least one cable 202 can be of various gauges including but not limited to 8 to 16 gauge and that would be within the spirit and scope of the present invention. In addition, one of ordinary skill in the art readily recognizes that the at least one cable 202 can be a variety of styles and materials including but not limited to singular wire or a plurality of wires stranded together and that would be within the spirit and scope of the present invention.

In the stable cable system 200, the at least one cable 202 is treated in a variety of ways including but not limited to galvanizing to deter rust and other deleterious materials from affecting the integrity of the at least one cable 202.

In another embodiment, the at least one cable 202 includes a plurality of loops separated by 8 inch interval lengths between each loop. The plurality of loops can be used to stabilize a plurality of trees. One of ordinary skill in the art readily recognizes that the plurality of loops can be separated by various designated interval lengths along the at least one cable 202 including but not limited to 4, 6, 8 and 10 inch interval lengths and that would be within the spirit and scope of the present invention.

As a result, the stable cable system 200 provides stability to the tree by holding it in place and not allowing it to move or slide along the at least one cable 202. In so doing, the stable cable system 200 reduces damage to the tree and improves the growth structure of the tree. This increases the yield of the tree and thus increases the nominal value of the tree inventory to the nursery.

Figure 3:
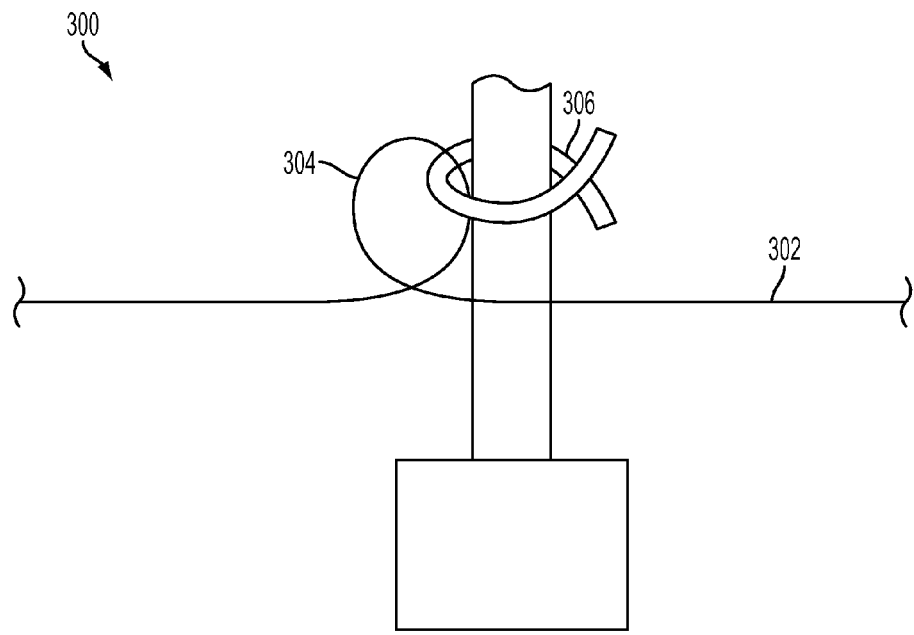
FIG. 3 illustrates a close-up view of a stable cable system in accordance with an embodiment.

FIG. 3 illustrates a close-up view of the stable cable system 300 including the at least one cable 302, the at least one loop 304 and the at least one connector 306 inserted through the at least one loop 304 and around a tree. In the stable cable system 300, the at least one loop 304 is continuous within the at least one cable 302 and created without breaking or cutting the at least one cable 302 at any point. This greatly enhances the integrity of the stable cable system 300 because it eliminates the possibility of separate parts disengaging from each other over time due to various factors including but not limited to wind and heavy stress.

In another embodiment, the at least one cable 302 is a plurality of wires stranded together which strengthens the integrity of the at least one loop 304. The plurality of wires stranded together become one stabilized unit which enables strong tension to be applied to the at least one cable 302 so that the at least one loop 304 does not unravel. One of ordinary skill in the art readily recognizes that the number of wires in the plurality of wires stranded together can vary in number including but not limited to 2, 3, 4, or 5 wires and that would be within the spirit and scope of the present invention. By varying the number of wires in the plurality of wires stranded together, different strengths and sizes of the at least one cable 302 are created.

Figure 4:
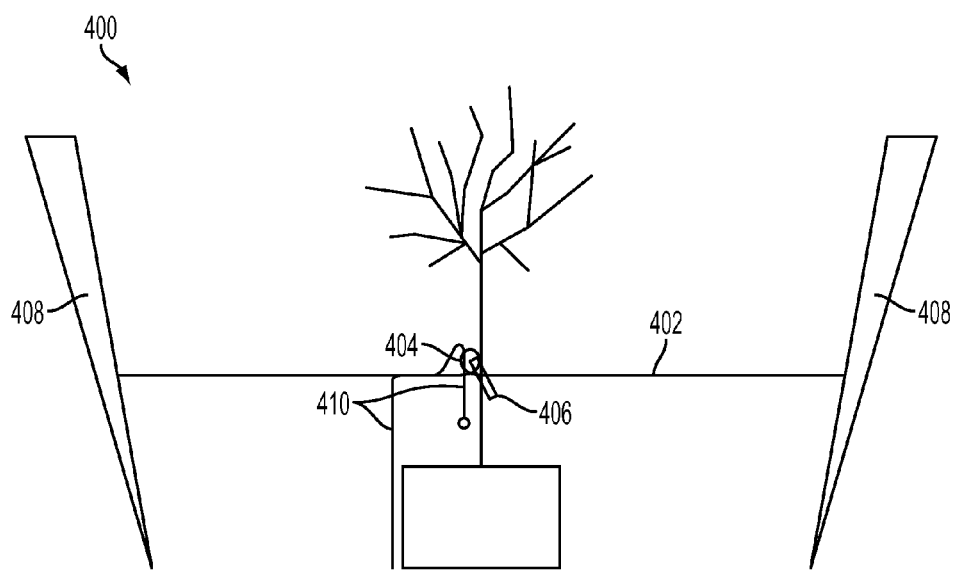
FIG. 4 illustrates another stable cable system in accordance with an embodiment.

Another advantage of the present invention deals with the stability of irrigation lines used to maintain a tree inventory. Stabilizing irrigation lines also reduces costs associated with irrigation maintenance labor. FIG. 4 illustrates a stable cable system 400 that includes at least one cable 402, at least one loop 404, at least one connector 406, at least two stakes 408 and at least one irrigation line 410.

In the stable cable system 400, the at least one cable 402 is coupled to the at least two stakes 408. In the stable cable system 400, the at least one cable 402 includes at least one loop 404 and the at least one connector 406 is inserted through the at least one loop 404 and around a tree. In the stable cable system 400, the at least one irrigation line 410 is coupled to the at least one cable 402.

One of ordinary skill in the art readily recognizes that the at least one irrigation line 410 can be coupled to the stable cable system 400 in a variety of others ways including but not limited to coupling the at least one irrigation line 410 to the at least one loop 404 and that would be within the spirit and scope of the present invention.

In another embodiment, the at least one irrigation line 410 is a drip irrigation line. One of ordinary skill in the art readily recognizes that the at least one irrigation line 410 can be a variety of types of irrigation lines and that would be within the spirit and scope of the present invention.

The present invention can also be a valuable tool for trellising row crops including but not limited to olives, kiwis, and grapes. In this embodiment, the stable cable system replaces the straight cable conventionally used to trellis row crops. This ensures the proper tying and stability of a vine or espalier of an orchard tree.

Figure 5:
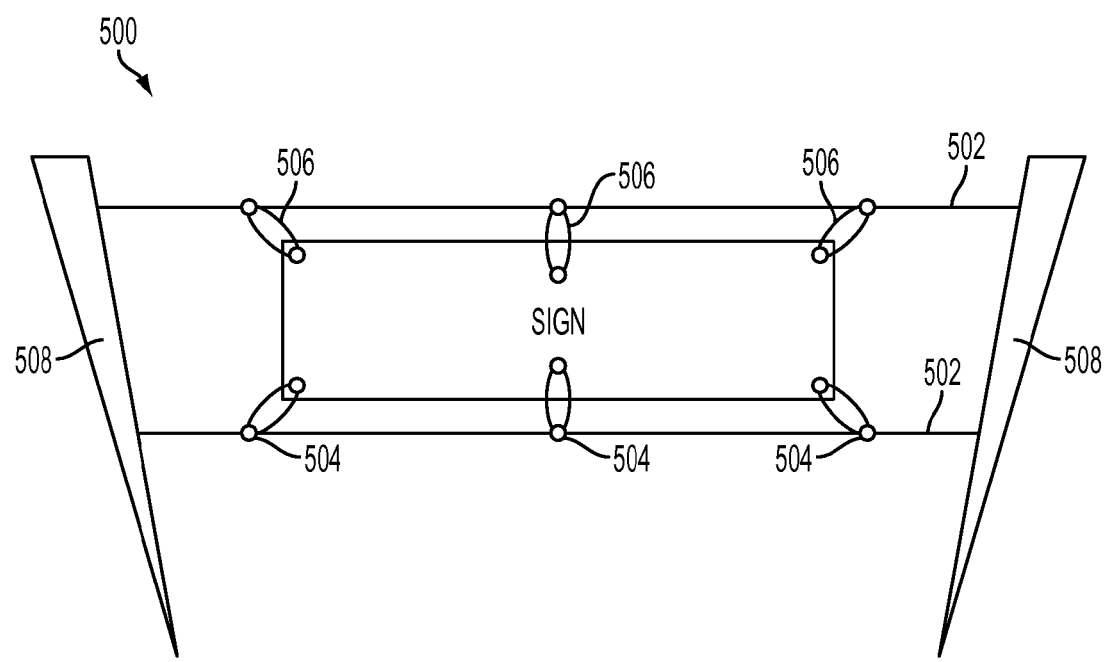
FIG. 5 illustrates another stable cable system in accordance with an embodiment.

As aforementioned, the present invention can be used to stabilize a variety of objects such as signs. FIG. 5 illustrates a stable cable system 500 that includes at least two cables 502, a plurality of loops 504, a plurality of connectors 506 and at least two stakes 508. In the stable cable system 500, the at least two cables 502 are coupled to the at least two stakes 508. In the stable cable system 500, each of the at least two cables 502 include a plurality of loops 504. In the stable cable system 500, each of the plurality of connectors 506 are inserted through each of the plurality of loops 504 and a hole in a sign. As a result, the stable cable system 500 provides stability to the sign by holding it tightly in place.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A stable cable system, comprising:
   at least two stakes;
   at least one cable,
   at least one continuous cable having one end coupled to at least one stake and an opposite end coupled to at least another one stake, wherein the at least one continuous cable has a preformed loop formed at a point on the at least one continuous cable, wherein the preformed loop is continuous within the at least one continuous cable and is created without breaking or cutting the at least one continuous cable at any point; and
   at least one connector, wherein the at least one connector is inserted through the preformed loop and around an object.

2. The stable cable system of claim 1, further comprising: wherein the at least one cable is 8 to 16 gauge cable.

3. The stable cable system of claim 1, further comprising: wherein the at least one cable is singular wire or a plurality of wires stranded together.

4. The stable cable system of claim 1, further comprising: wherein the at least one cable is galvanized to deter rust and other deleterious materials from affecting the integrity of the at least one cable.

5. The stable cable system of claim 1, further comprising: wherein the object is a tree.

6. The stable cable system of claim 1, further comprising: wherein the object is a row crop such as olives, kiwis, and grapes.

* * * * *